(No Model.)
J. V. N. STULTS.
TANK VALVE.
No. 432,579. Patented July 22, 1890.
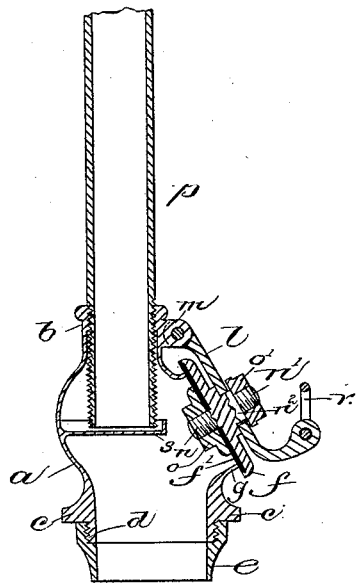
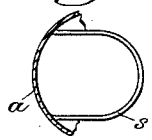
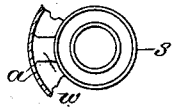
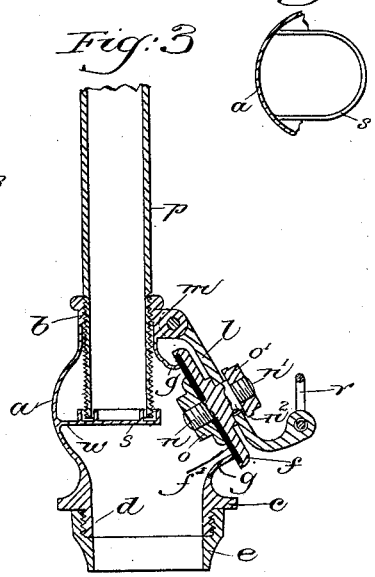
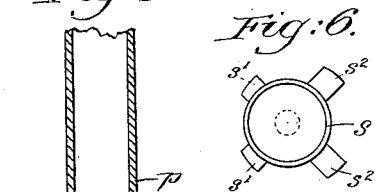
Witnesses.
Howard F. Eaton.
Fred L. Emery.
Inventor.
John V. N. Stults
by Crosby & Gregory
Attys.

UNITED STATES PATENT OFFICE.

JOHN V. N. STULTS, OF BOSTON, MASSACHUSETTS.

TANK-VALVE.

SPECIFICATION forming part of Letters Patent No. 432,579, dated July 22, 1890.

Application filed November 18, 1887. Serial No. 255,459. (No model.)

*To all whom it may concern:*

Be it known that I, JOHN V. N. STULTS, of Boston, county of Suffolk, State of Massachusetts, have invented an Improvement in Tank-Valves, of which the following description, in connection with the accompanying drawings, is a specification, like letters on the drawings representing like parts.

This invention has for its object the construction of a valve for use in connection with flushing-tanks for water-closets and similar purposes where a readily-controlled and rapid rush of water is required. Heretofore the operation of such valves has been accompanied by much unpleasant noise, caused by the air which is drawn through the overflow-pipe when the valve-piece is raised and the water admitted.

The object of this my invention is to construct a simple and efficient tank-valve which will be noiseless in its operation.

My invention consists, essentially, of a valve-case having an inlet-opening at its side and having a cup integral therewith to contain water, and the hinged or pivoted valve to normally close said inlet-opening, combined with a screw-threaded overflow-pipe extended into said valve-case from its upper end and entering said cup an adjustable distance to form a substantially permanent water seal, said cup being located with relation to the inlet-opening substantially as will be described.

Figure 1 is a sectional view of a valve embodying my invention, a portion of the overflow-pipe being shown; Fig. 2, a top view of a cup-shaped projection extending from the interior of the valve-case to form the water seal or trap. Fig. 3 is a sectional view of a modification of my invention; Fig. 4, a top view of the water seal. Fig. 5 is a sectional view of another modification of my invention, the overflow-pipe extending throughout the valve-case and the water seal not integral with the valve-case and Fig. 6 is a top view of the spider forming the water seal.

The valve-case $a$ is screw-threaded at one end, as at $b$, to receive the lower end of the overflow-pipe $p$, and at the other end is provided with the flange $c$ and screw-thread $d$ to enter the end of the coupling $e$. The valve-piece $f$, flanged to receive a suitable packing $f'$, is seated at $g$ $g$, and is attached to the bent lever $l$, pivoted to an ear $m$ of the valve-case. The valve-piece $f$ is provided with the screw-threaded lugs $n$ $n'$, integral therewith, one of the lugs, as $n$, passing through a hole in the packing and receiving upon it the nut $o$, which nut secures the packing to the valve-plate $f$. The other lug $n'$ has an enlarged base $n^2$, which passes through an opening in the lever $l$ and is screwed thereto by the nut $o'$.

Midway between the ends of the valve-case, and preferably integral therewith, is a projection or cup $s$, to form a seal or trap. (See Figs. 1 to 4.) The threaded end of the overflow-pipe $p$ is extended into the valve-case until it enters the cup $s$, the end of the pipe being below the side of the said cup, the threaded end of the pipe allowing the same to be adjusted with relation to the cup. By this construction a permanent water seal is made, due to the overflow water, the level of the water in the cup $s$ always being higher than the mouth of the pipe $p$, thus forming a trap to prevent air being sucked in through the overflow-pipe when the valve-piece is lifted and the water rushes into the valve-opening. It will be seen that if the valve-piece be not raised to its fullest extent there will be no difference in the operation of the seal, as the same is dependent for its efficacy upon the water flowing through the overflow-pipe and not through the valve-opening. The valve-piece $f$ is raised by its attached lever $l$, the lever being operated by a rod or chain $r$ in any usual manner.

In Figs. 3 and 4 the cup is circular, provided with two concentric flanges, between which the end of the overflow-pipe enters and is attached to the valve-case by a thin web $w$. In the modification shown in Figs. 5 and 6 the cup $s$ is cast separately in spider form, with legs $s'$ $s^2$, the legs $s'$ $s'$ being the shorter, in order that the upturned flange forming the cup, when in position, may be directly under the end of the pipe $p$. The legs of the spider are firmly held in the annular space between the coupling $e$ and the end $d$ of the valve-case.

As herein shown, the overflow-pipe is in one piece, extending down to the cup; but it is obvious that the said pipe could be made in two pieces, a short piece extending from the end of the valve-casing to the cup, the other attached to the outer end of the short piece or to the valve-case itself, such construction coming within the scope of my invention.

I claim—

The valve-case $a$, having an inlet-opening at its side and having a cup $s$ integral therewith, to contain water, and the hinged or pivoted valve to normally close the said inlet-opening, combined with the screw-threaded overflow-pipe extended into the said valve-case from its upper end and entering the said cup an adjustable distance by means of said screw-thread to form a substantially permanent water seal, the said cup being located with relation to the inlet-opening substantially as described.

In testimony whereof I have signed my name to this specification in the presence of two subscribing witnesses.

JOHN V. N. STULTS.

Witnesses:
G. W. GREGORY,
JOHN C. EDWARDS.